United States Patent
Fujita et al.

(10) Patent No.: US 12,165,654 B2
(45) Date of Patent: Dec. 10, 2024

(54) MULTI-SPEAKER DIARIZATION OF AUDIO INPUT USING A NEURAL NETWORK

(71) Applicants: The Johns Hopkins University, Baltimore, MD (US); Hitachi, Ltd., Tokyo (JP)

(72) Inventors: Yusuke Fujita, Tokyo (JP); Shinji Watanabe, Ellicott City, MD (US); Naoyuki Kanda, Tokyo (JP); Shota Horiguchi, Tokyo (JP)

(73) Assignees: The Johns Hopkins University, Baltimore, MD (US); Hitachi, Ltd., Tokyo (JP)

( * ) Notice: Subject to any disclaimer, the term of this patent is extended or adjusted under 35 U.S.C. 154(b) by 316 days.

(21) Appl. No.: 17/595,472

(22) PCT Filed: Aug. 31, 2020

(86) PCT No.: PCT/US2020/048730
§ 371 (c)(1),
(2) Date: Nov. 17, 2021

(87) PCT Pub. No.: WO2021/045990
PCT Pub. Date: Mar. 11, 2021

(65) Prior Publication Data
US 2022/0254352 A1    Aug. 11, 2022

Related U.S. Application Data

(60) Provisional application No. 62/896,392, filed on Sep. 5, 2019.

(51) Int. Cl.
*G10L 15/20* (2006.01)
*G06N 3/045* (2023.01)
(Continued)

(52) U.S. Cl.
CPC .............. *G10L 17/18* (2013.01); *G06N 3/045* (2023.01); *G10L 17/04* (2013.01)

(58) Field of Classification Search
None
See application file for complete search history.

(56) References Cited

U.S. PATENT DOCUMENTS

| 9,584,946 B1 | 2/2017 | Lyren et al. |
| 10,249,292 B2 | 4/2019 | Dimitriadis et al. |
(Continued)

FOREIGN PATENT DOCUMENTS

| JP | 2004145161 A | 5/2004 |
| JP | 2010175614 A | 8/2010 |

OTHER PUBLICATIONS

Neumann et al., "All-Neural online source separation, counting, and diarization for meeting analysis", Apr. 17, 2019, IEEE (Year: 2019).*

(Continued)

*Primary Examiner* — Seong-Ah A Shin
(74) *Attorney, Agent, or Firm* — Harrity & Harrity, LLP (57) ABSTRACT

An audio analysis platform may receive a portion of an audio input, wherein the audio input corresponds to audio associated with a plurality of speakers. The audio analysis platform may process, using a neural network, the portion of the audio input to determine voice activity of the plurality of speakers during the portion of the audio input, wherein the neural network is trained using reference audio data and reference diarization data corresponding to the reference audio data. The audio analysis platform may determine, based on the neural network being used to process the portion of the audio input, a diarization output associated with the portion of the audio input, wherein the diarization output indicates individual voice activity of the plurality of speakers. The audio analysis platform may provide the
(Continued)

diarization output to indicate the individual voice activity of the plurality of speakers during the portion of the audio input.

20 Claims, 6 Drawing Sheets

(51) Int. Cl.
    *G10L 15/06* (2013.01)
    *G10L 17/04* (2013.01)
    *G10L 17/18* (2013.01)

(56) References Cited

U.S. PATENT DOCUMENTS

| | | | |
|---|---|---|---|
| 10,957,337 B2* | 3/2021 | Chen | G10L 17/04 |
| 2018/0197548 A1* | 7/2018 | Palakodety | G10L 17/06 |
| 2018/0254040 A1 | 9/2018 | Droppo et al. | |
| 2019/0065464 A1 | 2/2019 | Finley et al. | |
| 2020/0219517 A1* | 7/2020 | Wang | G10L 17/02 |
| 2020/0322722 A1* | 10/2020 | Chen | H04R 3/005 |
| 2020/0349953 A1* | 11/2020 | Qin | G10L 15/26 |
| 2022/0012898 A1* | 1/2022 | Carreira | G06N 3/084 |

OTHER PUBLICATIONS

Neumann et al., "All-Neural Online Source Separation, Counting, and Diarization for Meeting Analysis," arXiv:1902.07881v1 [eess.AS], Feb. 21, 2019, 5 Pages.

Kolbaek et al. "Multi-talker Speech Separation With Utterance-Level Permutation Invariant Training of Deep Recurrent Neural Networks," IEEE/ACM Transactions on Audio, Speech, and Language Processing, 25(10), Jul. 11, 2017, 12 Pages.

Yoshioka et al., "Meeting Transcription Using Virtual Microphone Arrays," hypothearXiv: 1905.02545v2 [eess.AS], Jul. 7, 2019, 7 Pages.

International Search Report and Written Opinion—PCT/US2020/048730—ISA/RU—Nov. 30, 2020.

* cited by examiner

MULTI-SPEAKER DIARIZATION OF AUDIO INPUT USING A NEURAL NETWORK

CROSS-REFERENCE TO RELATED APPLICATIONS

This Patent Application is a 371 national stage of PCT Application PCT/US2020/048730 filed on Aug. 31, 2020, entitled "MULTI-SPEAKER DIARIZATION OF AUDIO INPUT USING A NEURAL NETWORK," which claims priority to U.S. Patent Application No. 62/896,392, filed on Sep. 5, 2019, and entitled "MULTI-SPEAKER DIARIZATION OF AUDIO INPUT USING A NEURAL NETWORK, both of which are hereby expressly incorporated by reference herein.

BACKGROUND

Automatic speech recognition (ASR) enables spoken language in an audio signal to be recognized and/or translated to text data (e.g., speech-to-text (STT)). ASR may be used to permit a user to control one or more functions of a device (e.g., a user device, such as a computer, a smartphone, a virtual assistant, and/or the like). For example, the device may implement ASR techniques to detect speech from a user as an audio input, determine a command associated with the speech (e.g., using natural language processing (NLP)), and perform an action corresponding to the command.

SUMMARY

According to some implementations, a method may include receiving a portion of an audio input, the audio input corresponding to audio associated with a plurality of speakers; processing, using a neural network, the portion of the audio input, to determine voice activity of the plurality of speakers during the portion of the audio input, the neural network being trained using reference audio data and reference diarization data corresponding to the reference audio data, the reference diarization data indicating timing associated with voice activity of individual reference speakers relative to timing of the reference audio data; determining, based on the neural network being used to process the portion of the audio input, a diarization output associated with the portion of the audio input, the diarization output indicating individual voice activity of the plurality of speakers; and providing the diarization output, to indicate the individual voice activity of the plurality of speakers during the portion of the audio input.

According to some implementations, a device may include one or more memories and one or more processors, communicatively coupled to the one or more memories, configured to: receive a portion of an audio input, the audio input corresponding to audio associated with a plurality of speakers; process, using a neural network, the portion of the audio input to determine voice activity of the plurality of speakers during the portion of the audio input, the neural network being trained using reference audio data and reference diarization data corresponding to the reference audio data, the reference diarization data indicating timing associated with voice activity of individual reference speakers relative to timing of the reference audio data; determine, based on the neural network being used to process the portion of the audio input, a diarization output associated with the portion of the audio input, the diarization output indicating individual voice activity of the plurality of speakers; and provide the diarization output to indicate the individual voice activity of the plurality of speakers during the portion of the audio input.

According to some implementations, a non-transitory computer-readable medium may store one or more instructions. The one or more instructions, when executed by one or more processors, may cause the one or more processors to: receive a portion of an audio input, the audio input corresponding to audio associated with a plurality of speakers; process, using a neural network, the portion of the audio input to determine voice activity of the plurality of speakers during the portion of the audio input, the neural network being trained using reference audio data and reference diarization data corresponding to the reference audio data, the reference diarization data indicating timing associated with voice activity of individual reference speakers relative to timing of the reference audio data; determine, based on the neural network being used to process the portion of the audio input, a diarization output associated with the portion of the audio input, the diarization output indicating individual voice activity of the plurality of speakers; and provide the diarization output to indicate the individual voice activity of the plurality of speakers during the portion of the audio input.

DETAILED DESCRIPTION

The following detailed description of example implementations refers to the accompanying drawings. The same reference numbers in different drawings may identify the same or similar elements.

In some instances, automatic speech recognition (ASR) may be used to detect and/or identify voice activity of a speaker in an audio input (e.g., an audio file, an audio stream, and/or the like). Previous techniques involving ASR may include performing a voice activity detection (e.g., detecting whether voice is present in an audio input), a speaker recognition (e.g., to identify a specific speaker by characteristics of the detected speech of the specific speaker), a speech-to-text (STT) analysis, and/or the like. However, previous techniques involving ASR may experience degraded performance with respect to identifying individual voice activity in audio input that includes multiple speakers and, more specifically, when overlapping speech (e.g., multiple speakers are simultaneously speaking) is present in the audio input. While previous techniques may include performing complex processes to separate individual speech from the audio input (e.g., a minimum variance distortionless response process), to identify individual speakers (e.g., by analyzing specific characteristics associated with individual voice activity of the multiple speakers), and/or the like, such complex processes can still be inaccurate due to not being optimized relative to voice activity that includes multiple speakers, and can be compute intensive and/or require relatively long periods of time (e.g., preventing real-time detection of which individuals are speaking).

According to some implementations described herein, an audio analysis platform may use a neural network (which may be referred to herein as a "diarization neural network" or "DNN") to process an audio input to determine individual voice activity through speaker diarization. For example, the neural network may be trained according to reference audio data and reference diarization data that indicates individual voice activity of speakers of a reference audio input. In some implementations, the reference audio data may be previously received audio inputs. In some implementations, the audio analysis platform may receive a portion of an audio input, process the portion of the audio input using the neural network, determine a diarization output for the portion of the audio input, and provide the diarization output (e.g., in association with audio of the audio input) to indicate individual voice activity of a plurality of speakers speaking in the portion of the audio input. In this way, using the diarization of the audio input (and/or portions of the audio input), the audio analysis platform may more accurately determine individual voice activity relative to previously used complex processes to separate speech from the audio input, recognize individual speaker identity based on characteristics (e.g., pitch, tone, frequency, wavelength, and/or the like) of the speech, and/or the like. Furthermore, the audio analysis platform may enhance processing time, relative to previous techniques, to enable real-time or near real-time processing and analysis of the audio input (which may enhance a user experience associated with receiving and/or viewing an annotated audio output (e.g., closed captioning) while accessing the audio input, such as a live audio stream).

Figure 1:
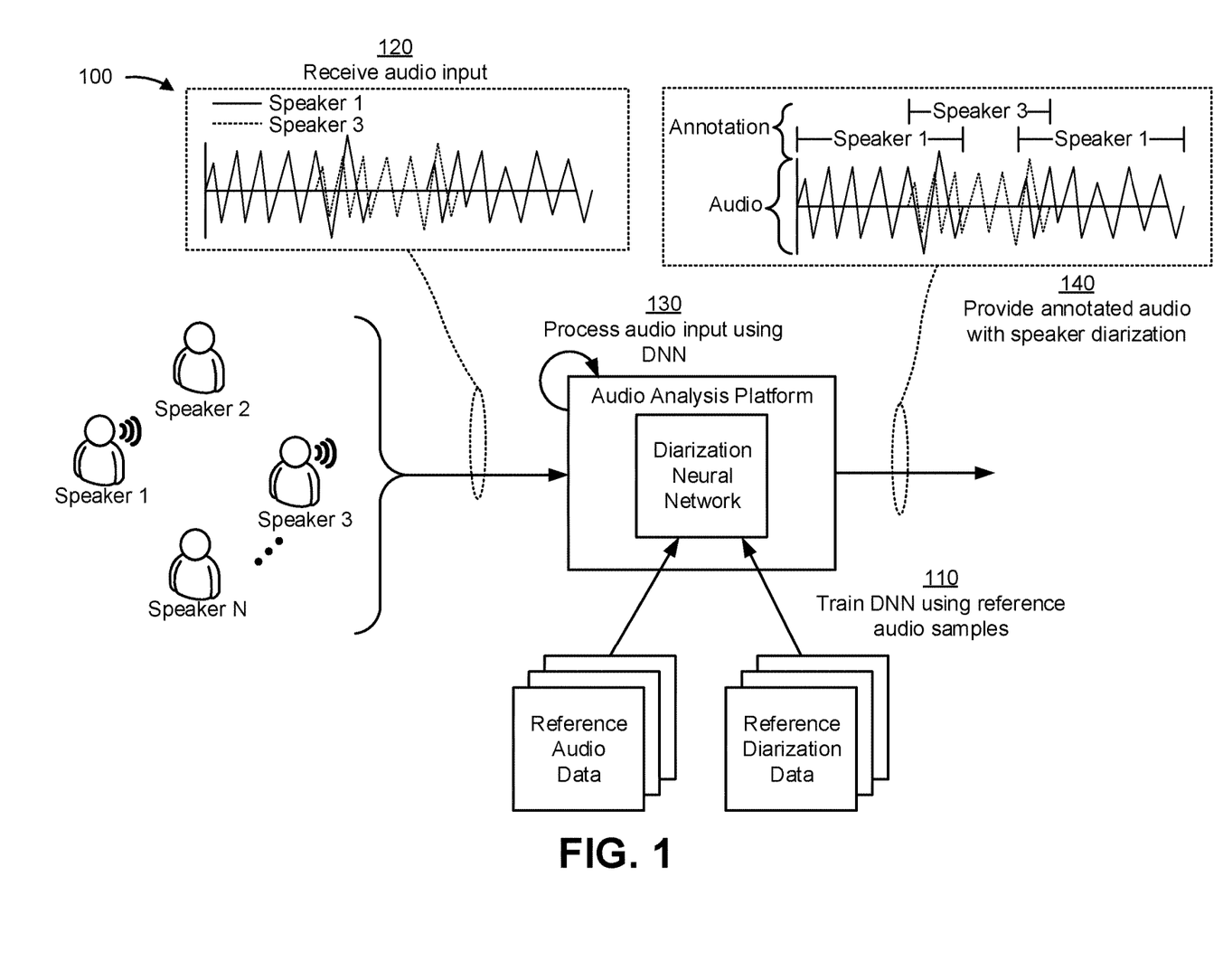
FIG. 1 is a diagram of an example implementation described herein.

FIG. 1 is a diagram of an example implementation 100 described herein. Example implementation 100 includes an audio analysis platform with a diarization neural network (DNN). As shown, and described in connection with example implementation 100, the DNN may be trained using reference audio data and reference diarization data. As described herein, the audio analysis platform may receive audio input that includes speech from N speakers (referred to herein individually as "speaker" and collectively as "speakers" and shown in FIG. 1 as "Speaker 1" to "Speaker N," where N≥1), process the audio input using the DNN, determine individual voice activity for the one or more speakers for portions of the audio input, and provide a corresponding diarization output to indicate which of the speakers is actively speaking in corresponding portions of the audio input. The DNN may be a recurrent neural network (RNN), a long short-term memory (LSTM) neural network, and/or the like.

As shown in FIG. 1, and by reference number 110, the DNN is trained using reference audio samples. For example, the audio analysis platform may train the DNN using reference audio samples that include reference audio data and corresponding reference diarization data for the audio data. As used herein, "diarization" (and/or "speaker diarization") corresponds to an indication of voice activity of one or more speakers during respective portions of audio (or an audio input). The reference audio samples may correspond to previously analyzed audio, reference conversations with known speaker diarization, including diarization of multiple, simultaneous speakers, and/or the like. Correspondingly, the reference audio data may be representative of the reference audio samples, and the reference diarization data may correspond to the diarization information for the reference audio data. The diarization information may indicate voice activity for individual reference speakers of the reference audio samples. In other words, the diarization data for a particular audio sample (and/or a particular portion of the audio sample) may indicate which reference speaker of a plurality of reference speakers is speaking in the audio sample (or during the particular portion of the audio sample).

According to some implementations, the DNN is trained to reduce a permutation-invariant loss value (e.g., according to a cross entropy calculation of the permutation). In such cases, the DNN may be trained by selecting a permutation that is the minimum loss value. The permutation-invariant loss value corresponds to a value that is less than all other remaining loss values calculated for all other remaining permutations. In this way, the DNN may be trained to select an analyzed permutation for a reference diarization information that has a relatively lower loss value and/or a minimum loss value of all values calculated for permutations analyzed for the portion of audio. Furthermore, according to some implementations, the selected analyzed permutation may be fed back into the neural network (e.g., using one or more LSTM layers). In this way, the reference diarization information of the neural network is selected to train the neural network based on a permutation invariant analysis of a plurality of reference diarization information.

To provide a diarization, the DNN may be configured by being trained using one or more training diarizations for one or more audio samples. The training diarizations for the one or more audio samples may correspond to various voice activity labels that indicate which speakers (and/or a probability of which speakers) were actively speaking during a corresponding portion of the audio input. Additionally, or alternatively, the training diarizations may correspond to permutations of voice activity labels for the audio input that can be processed by the DNN to determine a voice activity label that is representative of individual voice activity for the speakers in example implementation 100.

In some implementations, the reference audio data and/or the reference diarization data corresponds to previously analyzed and/or annotated portions of the audio input that is being analyzed. For example, audio data for a first portion of the audio input, and determined diarization data for the first portion of the audio input, may be fed back into the DNN as reference audio data and reference diarization data to train the DNN to determine voice activity of a second portion of the audio input (e.g., a portion of the audio input that is sequentially received after the first portion of the audio input). In this way, the DNN may be trained in real-time while processing a portion of an audio input to permit the DNN to improve accuracy (e.g., corresponding to a DER) with respect to determining and/or providing individual voice activity of the speakers in the audio input.

The DNN may be trained using a supervised training procedure that includes providing the reference audio data and corresponding diarization data to the DNN. In such a case, the reference audio data and/or reference diarization data may be generated by and/or provided from a user and/or may be associated with monitoring and/or analyzing one or more audio samples. In some implementations, the DNN may be trained using an unsupervised training procedure that involves automatically analyzing and/or processing a plurality of reference audio samples, determining reference diarizations of the reference audio samples (e.g., using the DNN and/or one or more other ASR techniques), and correspondingly weighting nodes of the DNN based on an accuracy of the DNN in analyzing the reference audio samples and/or the determined reference diarizations. Additionally, or alternatively, the DNN may be trained using an artificial neural network processing technique (e.g., using an RNN, an LSTM neural network, and/or the like) to perform pattern recognition with regard to patterns of whether diarizations for audio samples provide a minimum DER.

In this way, the audio analysis platform may train the DNN to cause the DNN to be configured to determine individual voice activity of a plurality of speakers (or multiple speakers) associated with an audio input.

As further shown in FIG. 1, and by reference number 120, the audio analysis platform receives an audio input. For example, the audio input may include a signal and/or audio data (e.g., an audio file, an audio stream, and/or the like) that is representative of a conversation between the N speakers, a meeting between the N speakers (e.g., recorded and/or streamed via a conference call application, a voice calling application, a multimedia streaming application, a meeting application, and/or the like), and/or the like. As described herein, when the audio input is an audio stream, the audio input may be delivered to an endpoint (e.g., a user device) that continuously plays back the audio input without saving the audio for a time period that is longer than is required for playback of the audio input (e.g., using storage resources).

In this way, the audio analysis platform may receive the audio input to permit the audio analysis platform to process the audio input using the DNN.

As further shown in FIG. 1, and by reference number 130, the audio analysis platform processes the audio input using the DNN. For example, the audio analysis platform may iteratively input sets of frames (referred to herein as "portions") of the audio input into the DNN to permit the DNN to indicate corresponding voice activity (e.g., speaker diarization) for the sets of frames. As described herein, a frame may correspond to a slice of audio (or of an audio signal), such as 0.008 seconds (accordingly, a 64 second interval may include 8000 frames). The DNN may be tuned such that a portion of the audio corresponds to a particular quantity of frames (e.g., based on one or more performance criteria, such as accuracy (e.g., DER), processing speed, computing resource requirement, and/or the like).

In some implementations, to process a portion of the audio input, the DNN may determine permutations of voice activity (e.g., possible variations of which speakers in an audio input and/or audio sample are speaking). For example, as described herein, if the audio input is associated with two speakers (e.g., the audio input includes speech from two separate speakers), the permutations for voice activity during a portion of the audio (when a voice is detected in an audio portion) may be that a first speaker of the two speakers is speaking, a second speaker of the two speakers is speaking, or both of the speakers are speaking. As the quantity of speakers increases, the quantity of permutations increases (e.g., according to a factorial of the quantity of speakers). For example, for N=2, there may be 2! permutations; for N=3, there may be 3! permutations, for N=4, there may be 4! permutations, and so on.

According to some implementations, the audio analysis platform may determine the quantity of speakers associated with an audio output to determine the permutations of voice activity of a portion of an audio output. For example, the audio analysis platform may receive information identifying the quantity of speakers in a portion of an audio input. Additionally, or alternatively, the audio analysis platform may automatically determine a quantity of speakers in an audio input (e.g., during a preprocessing and/or calibration stage of analyzing an audio input). In such a case, the audio analysis platform may use one or more processing techniques to identify distinguishable features of separate speech in the audio input. In some implementations, the audio analysis platform may use the DNN to determine the quantity of speakers in an audio input. For example, the DNN may adjust an analysis according to possible quantities of speakers until a diarization output that satisfies a threshold DER (e.g., a threshold DER that corresponds to a calibration threshold to identify a likely quantity of speakers) is determined for a threshold duration of the audio input (e.g., a threshold quantity of portions of the audio input).

In this way, the audio analysis platform may process the audio input to determine a diarization output (or diarization output stream) that indicates voice activity and/or corresponds to a voice activity label (e.g., that indicates which speakers are actively speaking in the portion of audio) for a portion of the audio input.

As further shown in FIG. 1, and by reference number 140, the audio analysis platform provides annotated audio with speaker diarization. For example, the audio analysis platform may generate an annotation (e.g., a voice activity label) that identifies which of the speakers (e.g., which of Speaker 1 to Speaker N) is currently speaking during a particular portion of the audio. For example, as shown in example implementation 100, Speaker 1 and Speaker 3 may be actively communicating during a portion of an audio illustrated in FIG. 1. Using the DNN, as described herein, the audio analysis platform may determine and provide a diarization output for that portion of the audio input that indicates that Speaker 1 and Speaker 3 are actively speaking during that portion of the audio input.

According to some implementations, the annotated audio output may include a diarization output that identifies the active speaker. For example, the audio analysis platform may assign an identifier to the potential speakers associated with the audio input. The identifier may be a generic identifier (e.g., "Speaker 1," "Speaker 2," "Speaker 3," and/or the like). Additionally, or alternatively, if a specific identity of a speaker (e.g., a name, a title, and/or the like) is known to the audio analysis platform, the audio analysis platform may use a specific identifier (e.g., the speaker's name, the speaker's title, and/or the like) corresponding to the specific identity of the speaker. For example, the specific identity of the speaker may be known to the audio analysis platform based on a user input (e.g., a user input that identifies which speaker is which during a calibration phase), based on the audio analysis platform learning from the audio input (e.g., using a natural language processing technique that detects the speakers identifying themselves and/or each other), based on characteristics of the voice of the speaker being mapped to the identity of the speaker, and/or the like.

As shown in the example of FIG. 1, the audio input includes speech from Speaker 1 and speech from Speaker 3. Accordingly, an annotated audio output, as shown, may play back the audio and, via the illustrated annotation (corresponding to a stream of diarization outputs), present and/or indicate when Speaker 1 is speaking while the audio input is playing back and when speaker 3 is speaking while the audio input is playing back. As shown, there are portions of the audio input that include overlapping speech (when Speaker 1 and Speaker 3 are both shown to be speaking in the audio input). Correspondingly, using the DNN as described herein, the audio analysis platform may indicate, during those portions, that both Speaker 1 and Speaker 3 were speaking.

According to some implementations, the audio analysis platform may receive the audio input as an audio stream, process the audio input as described herein, and provide (or stream) an annotated audio output (as an output stream) to a user device to permit the user device to play back the annotated audio output. In such cases, the annotated audio output may permit the user device to audibly play the audio of the audio input in association with providing a diarization output stream that comprises diarization outputs for corresponding portions of the audio input. In this way, the annotated audio output, with the diarization outputs, may permit the user device to visually present voice activity of the audio via a user interface (e.g., a display), to announce (e.g., via a speaker playing back the audio) voice activity in association with the playing back the audio, and/or the like.

In this way, the audio analysis platform may generate and/or provide a diarization output and/or an annotated audio output to permit a user to identify which of the speakers are speaking while the audio input is played back (e.g., via a user device of the user).

As indicated above, FIG. 1 is provided merely as one or more examples. Other examples may differ from what is described with regard to FIG. 1.

Figure 2:
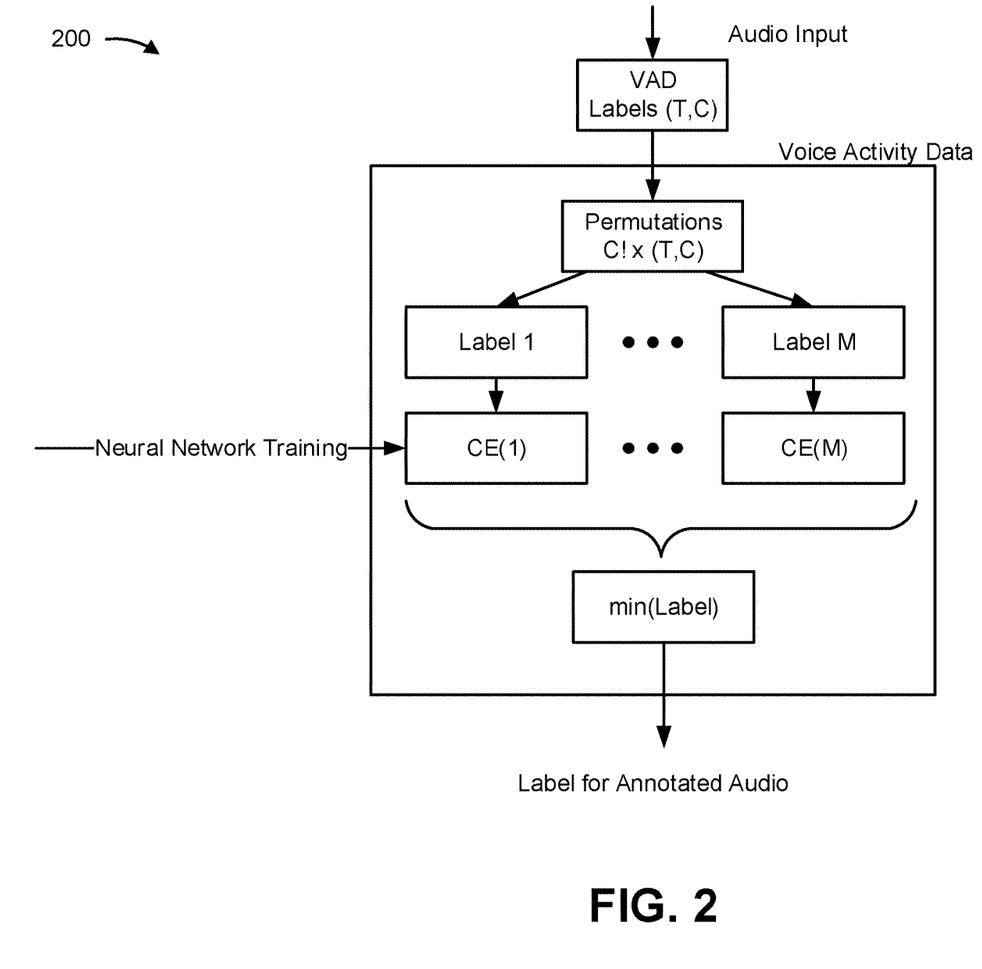
FIG. 2 is a diagram of an example architecture of a neural network that may be implemented in the example implementation of FIG. 1.

FIG. 2 is a diagram of an example architecture of a neural network 200 that may be implemented in the example implementation of FIG. 1. For example, neural network 200 may correspond to the DNN of FIG. 1.

Neural network 200 includes a multi-speaker voice activity detector (VAD) that identifies a time "T" and quantity of speakers "C." The time T may correspond to a moment and/or portion of the audio input. Accordingly, as an audio input is received, the VAD may determine whether a voice has been detected or not. When voice activity is detected, the neural network determines the permutations of the possible speakers associated with the voice activity and designates voice activity labels (e.g., shown as "Label 1" to "Label M" where M corresponds to the quantity of permutations) corresponding to the permutations of the possible active speakers associated with the audio input.

As an example, for FIG. 2, when the quantity of speakers, C, is four, neural network 200 may determine 24 voice activity labels (M=4!=24) for the permutations. Each of the voice activity labels may be binary labels, where a "1" represents that a speaker is speaking and a "0" represents that a speaker is not speaking. In such a case, [1, 0, 0, 0] may represent that Speaker 1 is speaking, [0, 1, 0, 0] may represent that Speaker 2 is speaking, [0, 0, 1, 0] may represent that Speaker 3 is speaking, and [0, 0, 0, 1] may represent that Speaker 4 is speaking. Furthermore, overlapping speech during a duration of an audio output may be represented by the label including multiple 1's. For example, [1, 0, 1, 0] may represent active voice activity of both Speaker 1 and Speaker 3, [0, 1, 1, 0] may represent active voice activity of both Speaker 2 and Speaker 3, [0, 0, 1, 1] may represent active voice activity of both Speaker 3 and Speaker 4, and so on. As described herein, a diarization output may correspond to one or more of the permutations of voice activity labels of neural network 200.

As described herein, neural network 200 may be trained using neural network training that is input into a cross entropy analysis of the permutations. The neural network training may correspond to a plurality of reference audio data and corresponding reference diarization data. The neural network training may be tuned by adjusting certain parameters that determine the amount of reference audio data, characteristics of the reference audio data, characteristics of reference diarization data corresponding to the reference audio data, and/or the like. For example, neural network training may be tunable to adjust a quantity of LSTM layers of neural network 200, a duration (or quantity of frames) of a portion of the audio input that is to be analyzed and/or of the reference audio data, a number of hidden units of neural network 200, and/or the like. Additionally, or alternatively, neural network training may involve a plurality of functions, such as a sigmoid (or other type of squashing function), a linear transformation, a Short-Time Fourier Transform (STFT) according to the time T and a quantity of Fast Fourier Transform (FFT) bins of reference audio data in neural network 200, and/or the like.

In some implementations, the reference audio data and reference diarization data used to train neural network 200 correspond to most recently analyzed portions of an audio input that is being analyzed by neural network 200, as described herein. For example, the reference audio data may correspond to a most recent time period (e.g., a most recent 64 seconds, a most recent 120 seconds, and/or the like) and/or a most recently received set of frames (e.g., a most recent 8000 frames, a most recent 12,000 frames, and/or the like) of the audio input. In this way, the neural network 200 may be trained according to the specific audio input that is being analyzed. In some implementations, during an initial time period of the audio input (e.g., which may correspond to an initial time period corresponding to the above most recent time period or an initial quantity of frames corresponding to the most recent quantity of frames), the neural network may use reference audio data and corresponding diarization data from other reference audio samples (e.g., previously recorded and/or diarized audio) to permit neural network 200 to calibrate (or adapt) to the speakers using the other reference audio samples.

To process the audio input, neural network 200 may perform a cross entropy analysis of each of the permutations using the neural network training. The cross entropy analysis may be configured to reduce and/or minimize a permutation-invariant loss value of the permutations. Accordingly, based on the cross entropy analyses of the permutations, neural network 200 may select the permutation that satisfies a threshold permutation-invariant loss value (e.g., a threshold value that corresponds to being a lowest value calculated for the permutations, a threshold value that corresponds to being within the lowest percentage of values calculated for the permutations, and/or the like). In this way, neural network 200 may be trained to reduce or minimize a permutation-invariant loss.

Furthermore, as shown, the label for the annotated audio output may correspond to the permutation that satisfied the permutation-invariant loss threshold, thus indicating which speakers are most likely to be actively speaking during the portion of the audio that is being analyzed. For example, if permutation [1, 0, 1, 0] corresponds to the permutation that satisfied the permutation-invariant loss threshold (and/or provided the minimum permutation-invariant loss value), the label for the annotated audio may indicate that Speaker 1 and Speaker 3 were actively speaking (and/or that there was overlapping speech) during that portion of the audio input.

As indicated above, FIG. 2 is provided merely as one or more examples. Other examples may differ from what is described with regard to FIG. 2.

Figure 3:
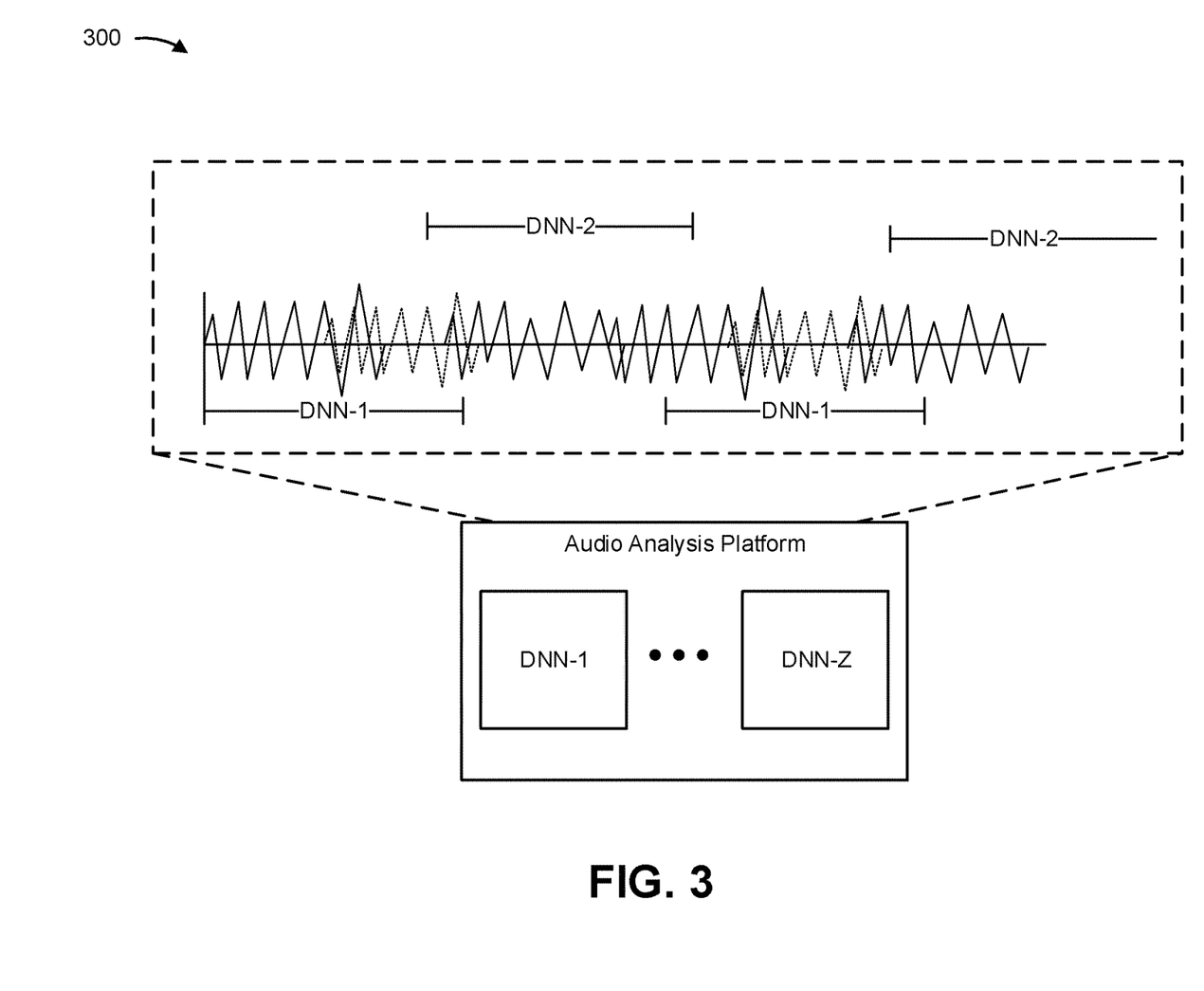
FIG. 3 is a diagram of an example implementation described herein.

FIG. 3 is a diagram of an example implementation 300 described herein. In example implementation 300, audio analysis platform includes multiple instances of a DNN (shown as DNN-1 to DNN-Z, where Z corresponds to the quantity of instances of the DNN). DNN-1 to DNN-Z may correspond to the same DNN (e.g., a DNN that is trained and/or configured using the same reference audio data and same reference diarization data). According to some implementations, the audio analysis platform may have a limited amount of computing resources and/or the DNN may be configured to require a relatively long time period (e.g., due to a relatively high quantity of LSTM layers, a relatively large amount of reference audio data and reference diarization data, and/or the like) to determine a diarization output for a portion of an audio input. In such cases, the audio analysis platform may implement and/or utilize multiple instances of the DNN to permit the multiple instances of the DNN to process different portions of the audio input.

For example, as shown, a first instance DNN-1 and a second instance DNN-2 may alternate processing portions of the audio input, to decrease an overall amount of time that would be required to process the portions of the audio input. More specifically, DNN-1 and DNN-2 may (at times) simultaneously process portions of the audio input to decrease the overall amount of time. In such an example, a first portion that is processed by DNN-1 may include a same set of frames as a second portion that is processed by DNN-2. As described herein, the audio input may correspond to an audio stream, which may be a live audio stream (e.g., corresponding to a live event, such as a live conversation, a live meeting, a live newscast, a live sporting event, and/or the like). In such cases, it may be desirable to determine and/or provide a diarization output (e.g., an annotation and/or voice activity label) associated with the live audio stream as the audio is being played (e.g., in real-time or near real-time, relative to an industry standard). Accordingly, using multiple instances of the DNN, the audio analysis platform may effectively decrease an amount of time between determining diarization outputs for a portion of an audio output, while maintaining parameters of the DNN that enable a relatively high threshold of accuracy.

In this way, the audio analysis platform may use a plurality of instances of a DNN to decrease the amount of time between determining a diarization output and/or providing an annotation of an annotated audio output, as described herein.

As indicated above, FIG. 3 is provided merely as one or more examples. Other examples may differ from what is described with regard to FIG. 3.

Accordingly, as described herein, the audio analysis platform may use a neural network to determine diarization of multi-speaker audio and/or overlapping speech. Accordingly, using the diarization, the audio analysis platform may conserve computing resources and/or improve processing time by avoiding wasting resources and/or performing complex processes (that consume more resources relative to the example implementations described herein) to determine which speakers in an audio input are actively speaking and/or providing corresponding information indicating which speakers are speaking when playing back the audio of the audio input.

Figure 4:
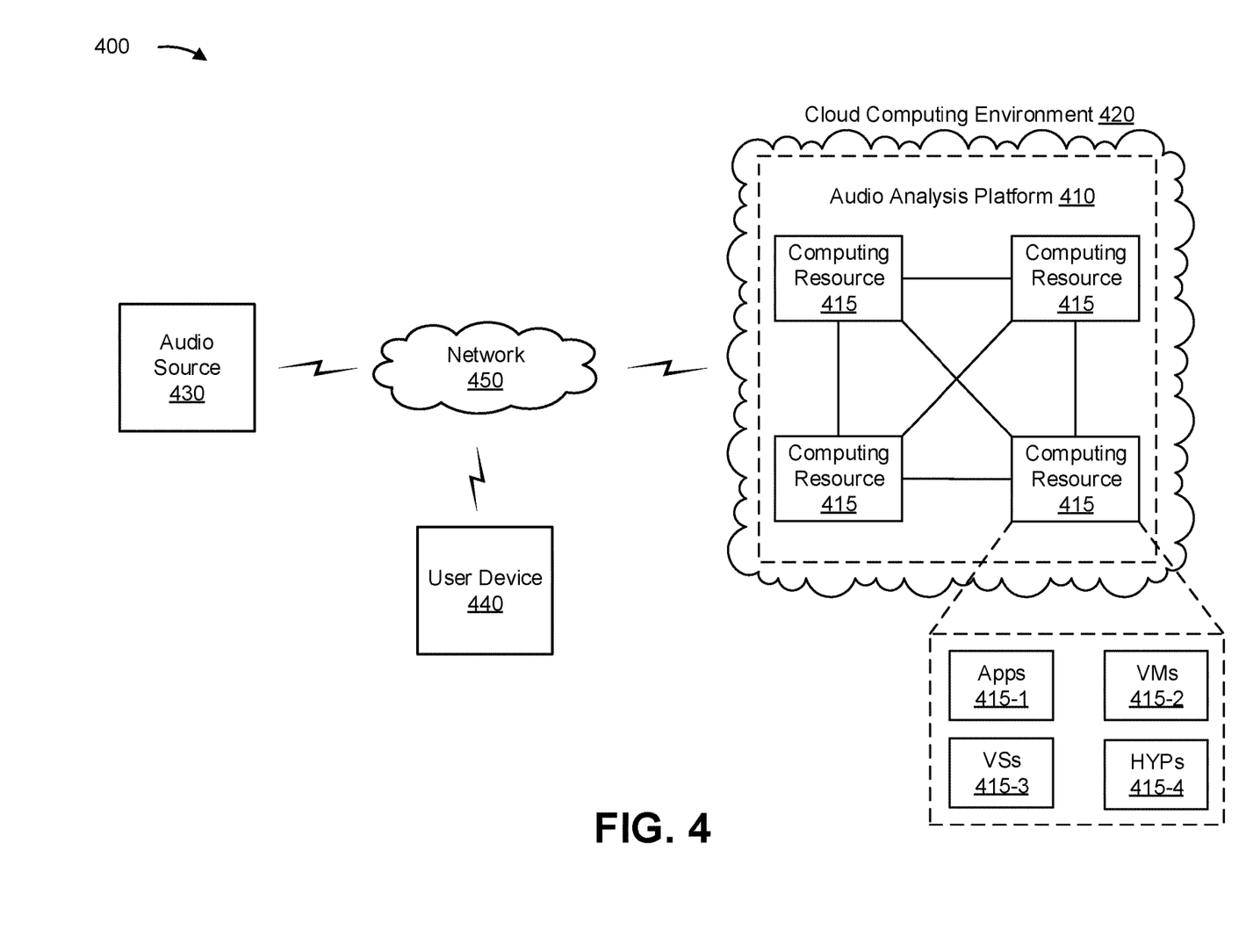
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include an audio analysis platform 410 hosted by one or more computing resources 415 of a cloud computing environment 420, an audio source 430, and a user device 440. Devices of environment 400 may interconnect via wired connections, wireless connections, or a combination of wired and wireless connections.

Audio analysis platform 410 includes one or more computing resources assigned to determine and/or provide individual voice activity of a plurality of speakers associated with an audio input. For example, audio analysis platform 410 may be a platform, implemented by cloud computing environment 420, that may process an audio input, determine a speaker diarization of the audio input, and/or provide a diarization output associated with the audio input (e.g., as an annotated audio output) to indicate voice activity associated with the audio input, as described herein. In some implementations, audio analysis platform 410 is implemented by computing resources 415 of cloud computing environment 420.

Audio analysis platform 410 may include a server device or a group of server devices. In some implementations, audio analysis platform 410 may be hosted in cloud computing environment 420. Notably, while implementations described herein may describe audio analysis platform 410 as being hosted in cloud computing environment 420, in some implementations, audio analysis platform 410 may be non-cloud-based or may be partially cloud-based.

Cloud computing environment 420 includes an environment that delivers computing as a service, whereby shared resources, services, and/or the like may be provided to process an audio input using a neural network to determine a diarization output and/or provide the diarization output (or diarization output stream) and/or an annotated audio output (or annotated audio output stream). Cloud computing environment 420 may provide computation, software, data access, storage, and/or other services that do not require end-user knowledge of a physical location and configuration of a system and/or a device that delivers the services. As shown, cloud computing environment 420 may include computing resources 415.

Computing resource 415 includes one or more personal computers, workstation computers, server devices, or another type of computation and/or communication device. In some implementations, computing resource 415 may host audio analysis platform 410. The cloud resources may include compute instances executing in computing resource 415, storage devices provided in computing resource 415, data transfer devices provided by computing resource 415, and/or the like. In some implementations, computing resource 415 may communicate with other computing resources 415 via wired connections, wireless connections, or a combination of wired and wireless connections.

As further shown in FIG. 4, computing resource 415 may include a group of cloud resources, such as one or more applications ("APPs") 415-1, one or more virtual machines ("VMs") 415-2, virtualized storage ("VSs") 415-3, one or more hypervisors ("HYPs") 415-4, or the like.

Application 415-1 includes one or more software applications that may be provided to or accessed by audio source 430 and/or user device 440. Application 415-1 may eliminate a need to install and execute the software applications on audio source 430 and/or user device 440. For example, application 415-1 may include software associated with audio analysis platform 410 and/or any other software capable of being provided via cloud computing environment 420. In some implementations, one application 415-1 may send/receive information to/from one or more other applications 415-1, via virtual machine 415-2.

Virtual machine 415-2 includes a software implementation of a machine (e.g., a computer) that executes programs like a physical machine. Virtual machine 415-2 may be either a system virtual machine or a process virtual machine, depending upon use and degree of correspondence to any real machine by virtual machine 415-2. A system virtual machine may provide a complete system platform that supports execution of a complete operating system. A process virtual machine may execute a single program and may support a single process. In some implementations, virtual machine 415-2 may execute on behalf of an audio source (e.g., audio source 430) and/or a user device (e.g., user device 440), and may manage infrastructure of cloud computing environment 420, such as data management, synchronization, or long-duration data transfers.

Virtualized storage 415-3 includes one or more storage systems and/or one or more devices that use virtualization techniques within the storage systems or devices of computing resource 415. In some implementations, within the context of a storage system, types of virtualizations may include block virtualization and file virtualization. "Block virtualization" may refer to abstraction (or separation) of logical storage from physical storage so that the storage system may be accessed without regard to physical storage or heterogeneous structure. The separation may provide administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 415-4 provides hardware virtualization techniques that allow multiple operating systems (e.g., "guest operating systems") to execute concurrently on a host computer, such as computing resource 415. Hypervisor 415-4 may present a virtual operating platform to the "guest operating systems" and may manage the execution of the guest operating systems. Multiple instances of a variety of operating systems may share virtualized hardware resources.

Audio source 430 includes one or more devices capable of receiving, generating, storing, processing, and/or providing an audio input (e.g., an audio stream, an audio file, an audio signal, and/or the like) associated with audio that includes voice activity from one or more speakers, as described herein. For example, audio source 430 may include a device with a microphone, a communication device, and/or a computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device.

User device 440 includes one or more devices capable of receiving, generating, storing, processing, and/or providing information associated with accessing audio and/or diarization data (e.g., as annotated audio output) that is processed by audio analysis platform 410 in accordance with some implementations described herein. For example, user device 440 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device.

Network 450 includes one or more wired and/or wireless networks. For example, network 450 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 4 are provided as one or more examples. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
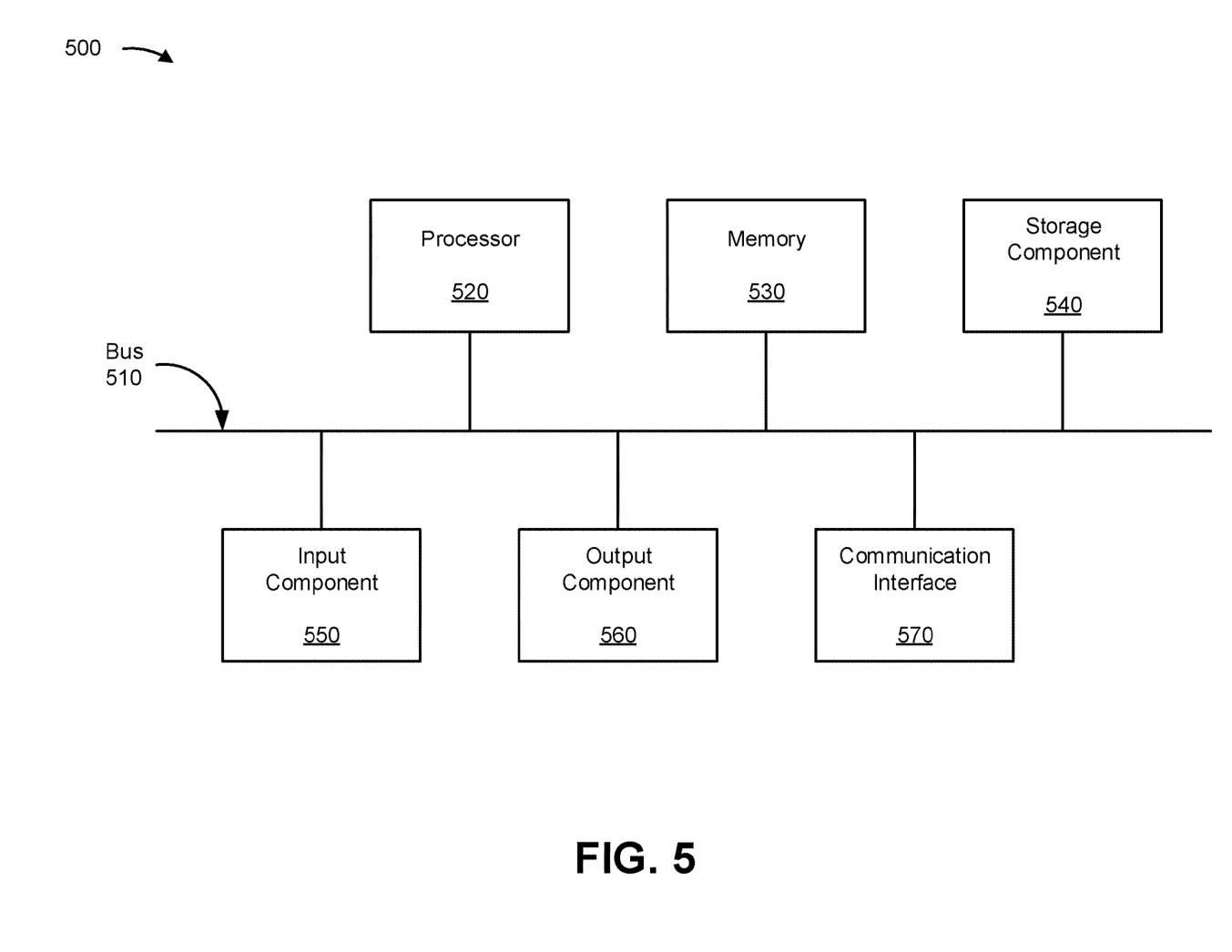
FIG. 5 is a diagram of example components of one or more devices of FIG. 2.

FIG. 5 is a diagram of example components of a device 500. Device 500 may correspond to audio analysis platform 410, computing resource 415, audio source 430, and/or user device 440. In some implementations, audio analysis platform 410, computing resource 415, audio source 430, and/or user device 440 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among multiple components of device 500. Processor 520 is implemented in hardware, firmware, and/or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a component for determining location (e.g., a global positioning system (GPS) component) and/or a sensor (e.g., an accelerometer, a gyroscope, an actuator, another type of positional or environmental sensor, and/or the like). Output component 560 includes a component that provides output information from device 500 (via, e.g., a display, a speaker, a haptic feedback component, an audio or visual indicator, and/or the like).

Communication interface 570 includes a transceiver-like component (e.g., a transceiver, a separate receiver, a separate transmitter, and/or the like) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, and/or the like.

Device 500 may perform one or more processes described herein. Device 500 may perform these processes based on processor 520 executing software instructions stored by a non-transitory computer-readable medium, such as memory 530 and/or storage component 540. As used herein, the term "computer-readable medium" refers to a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
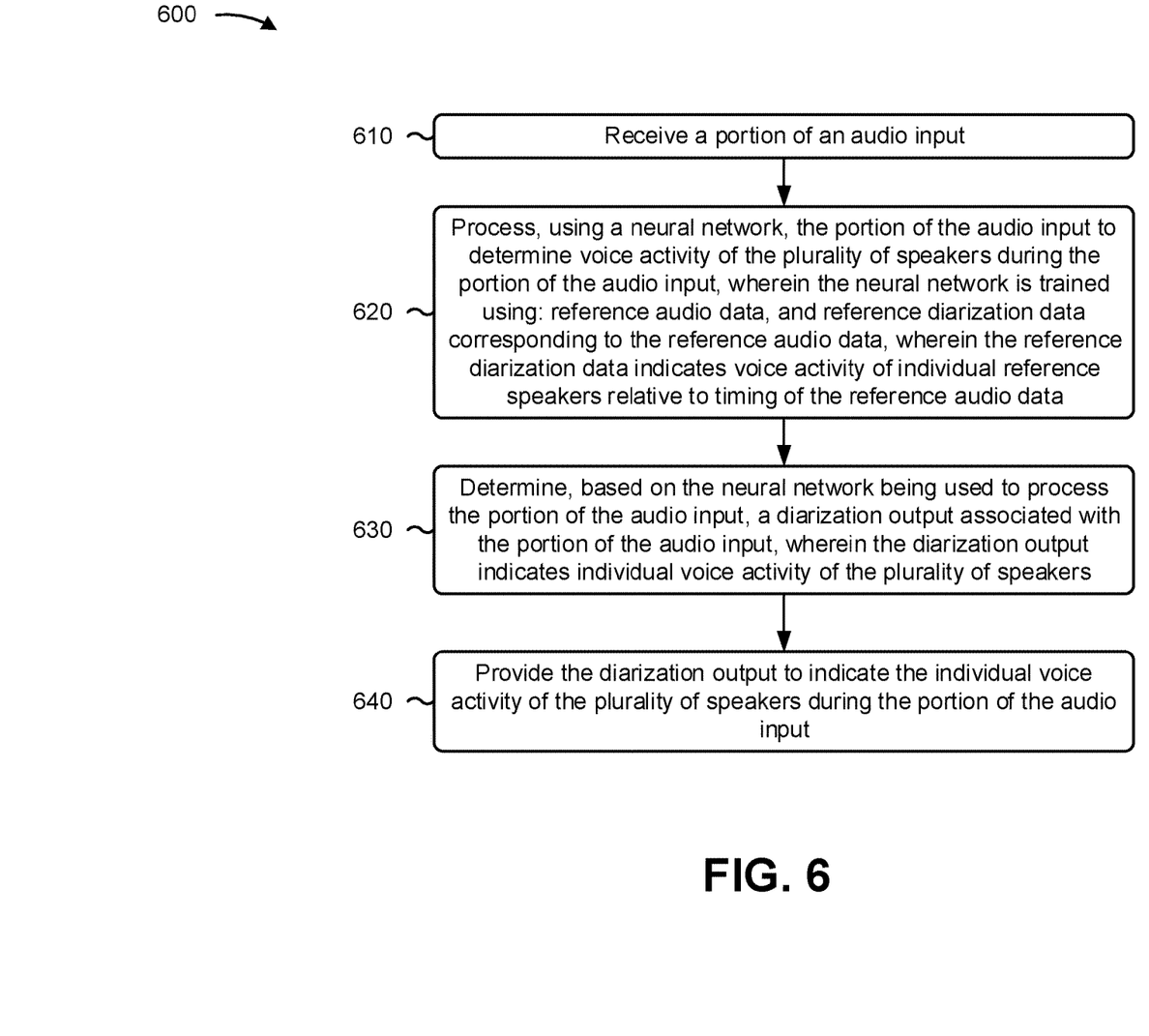
FIG. 6 is a flowchart of an example process associated with multi-speaker diarization of audio input using a neural network.

FIG. 6 is a flowchart of an example process 600 associated with multi-speaker diarization of audio input using a neural network. In some implementations, one or more process blocks of FIG. 6 may be performed by an audio analysis platform (e.g., audio analysis platform 410). In some implementations, one or more process blocks of FIG. 6 may be performed by another device or a group of devices separate from or including the audio analysis platform, such as an audio source (e.g., audio source 430), a user device (e.g., user device 440), and/or the like.

As shown in FIG. 6, process 600 may include receiving a portion of an audio input, wherein the audio input corresponds to audio associated with a plurality of speakers (block 610). For example, the audio analysis platform (e.g., using computing resource 415, processor 520, memory 530, storage component 540, input component 550, output component 560, communication interface 570, and/or the like) may receive a portion of an audio input, as described above. In some implementations, the audio input corresponds to audio associated with a plurality of speakers.

As further shown in FIG. 6, process 600 may include processing, using a neural network, the portion of the audio input to determine voice activity of the plurality of speakers during the portion of the audio input, wherein the neural network is trained using reference audio data and reference diarization data corresponding to the reference audio data, wherein the reference diarization data indicates timing associated with voice activity of individual reference speakers relative to timing of the reference audio data (block 620). For example, the audio analysis platform (e.g., using computing resource 415, processor 520, memory 530, storage component 540, input component 550, output component 560, communication interface 570, and/or the like) may process, using a neural network, the portion of the audio input to determine voice activity of the plurality of speakers during the portion of the audio input, as described above. In some implementations, the neural network is trained using reference audio data and reference diarization data corresponding to the reference audio data. In some implementations, the reference diarization data indicates timing associated with voice activity of individual reference speakers relative to timing of the reference audio data.

As further shown in FIG. 6, process 600 may include determining, based on the neural network being used to process the portion of the audio input, a diarization output associated with the portion of the audio input, wherein the diarization output indicates individual voice activity of the plurality of speakers (block 630). For example, the audio analysis platform (e.g., using computing resource 415, processor 520, memory 530, storage component 540, input component 550, output component 560, communication interface 570, and/or the like) may determine, based on the neural network being used to process the portion of the audio input, a diarization output associated with the portion of the audio input, as described above. In some implementations, the diarization output indicates individual voice activity of the plurality of speakers.

As further shown in FIG. 6, process 600 may include providing the diarization output to indicate the individual voice activity of the plurality of speakers during the portion of the audio input (block 640). For example, the audio analysis platform (e.g., using computing resource 415, processor 520, memory 530, storage component 540, input component 550, output component 560, communication interface 570, and/or the like) may provide the diarization output to indicate the individual voice activity of the plurality of speakers during the portion of the audio input, as described above.

Process 600 may include additional implementations, such as any single implementation or any combination of implementations described below and/or in connection with one or more other processes described elsewhere herein.

In a first implementation, the audio analysis platform, when processing the portion of the audio input, may determine permutations of voice activity of the plurality of speakers and perform a loss analysis of the permutations of voice activity of the plurality of speakers. In some implementations, the diarization output is determined to be the permutation that satisfies a threshold permutation-invariant loss value according to the cross entropy analysis. In a second implementation, alone or in combination with the first implementation, the reference audio data of the neural network is selected to train the neural network based on a permutation invariant analysis of a plurality of reference audio samples.

In a third implementation, alone or in combination with one or more of the first and second implementations, when determining the diarization output, the permutation invariant analysis causes the neural network to reduce a permutation-invariant loss. In some implementations, the permutation-invariant loss is reduced by causing the neural network to select the diarization output from permutations of voice activity of the plurality of speakers.

In a fourth implementation, alone or in combination with one or more of the first through third implementations, the portion of the audio input is a first portion of the audio input and the diarization output is a first diarization output, and the audio analysis platform may receive a second portion of the audio input; process, using the neural network, the second portion of the audio input to determine voice activity of the plurality of speakers during the second portion of the audio input; determine, based on the neural network being used to process the second portion of the audio input, a second diarization output associated with the second portion of the audio input, and provide the second diarization output to indicate the individual voice activity of the plurality of speakers during the second portion of the audio input. In a fifth implementation, alone or in combination with one or more of the first through fourth implementations, the first diarization output is determined using a first instance of the neural network and the second diarization output is determined using a second instance of the neural network and the first diarization output. Additionally, or alternatively, the first neural network and the second neural network are separate instances of the same neural network.

In a sixth implementation, alone or in combination with one or more of the first through fifth implementations, the diarization output indicates that two or more of the plurality of speakers are simultaneously actively speaking during the portion of the audio input. In a seventh implementation, alone or in combination with one or more of the first through sixth implementations, the audio input is an audio stream, and the diarization output is provided in real-time relative to streaming playback of the portion of the audio stream. In an eighth implementation, alone or in combination with one or more of the first through seventh implementations, the neural network comprises at least one of: a recurrent neural network, or a long short-term memory neural network.

In a ninth implementation, alone or in combination with one or more of the first through eighth implementations, the audio analysis platform may synchronize the diarization output with the audio input to generate an annotated audio output, and the diarization output is provided within the annotated audio output. In a tenth implementation, alone or in combination with one or more of the first through ninth implementations, the annotated audio output enables one or more of the plurality of speakers to be identified as an active speaker in association with the portion of the audio input.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:
1. A method, comprising:
 receiving, by a device, a portion of an audio input,
  wherein the audio input corresponds to audio associated with a plurality of speakers;

processing, by the device and using a neural network, the portion of the audio input to determine voice activity of the plurality of speakers during the portion of the audio input,
   wherein the neural network is trained using:
      reference audio data, and
      reference diarization data corresponding to the reference audio data,
         wherein the reference diarization data indicates voice activity of individual reference speakers relative to timing of the reference audio data;
determining, by the device and based on the neural network being used to process the portion of the audio input, a diarization output associated with the portion of the audio input,
   wherein processing the portion of the audio input comprises:
      determining permutations of voice activity of the plurality of speakers; and
      performing a cross entropy analysis of the permutations,
         wherein the diarization output is determined to be a permutation of the permutations, of voice activity of the plurality of speakers, that satisfies a threshold permutation-invariant loss value according to the cross entropy analysis, and
      wherein the diarization output indicates individual voice activity of the plurality of speakers; and
providing, by the device, the diarization output to indicate the individual voice activity of the plurality of speakers during the portion of the audio input.

2. The method of claim 1, wherein processing the portion of the audio input comprises:
   determining permutations of voice activity of the plurality of speakers; and
   performing a loss analysis of the permutations of voice activity of the plurality of speakers,
      wherein the diarization output is determined to be a permutation that satisfies a threshold permutation-invariant loss value according to the loss analysis.

3. The method of claim 1, wherein the reference diarization data of the neural network is selected to train the neural network based on a permutation invariant analysis of a plurality of reference audio samples.

4. The method of claim 3, wherein, when determining the diarization output, the permutation invariant analysis causes the neural network to reduce a permutation-invariant loss,
   wherein the permutation-invariant loss is reduced by causing the neural network to select the diarization output from the permutations of voice activity of the plurality of speakers.

5. The method of claim 1, wherein the portion of the audio input is a first portion of the audio input, the diarization output is a first diarization output, and the neural network is a first neural network, and
   wherein the method further comprises:
      receiving a second portion of the audio input;
      processing, using a second neural network, the second portion of the audio input to determine voice activity of the plurality of speakers during the second portion of the audio input;
      determining, based on the second neural network being used to process the second portion of the audio input, a second diarization output associated with the second portion of the audio input; and
      providing the second diarization output to indicate the individual voice activity of the plurality of speakers during the second portion of the audio input.

6. The method of claim 5, wherein the first neural network and the second neural network are separate instances of the same neural network.

7. A device, comprising:
   one or more memories; and
   one or more processors communicatively coupled to the one or more memories, configured to:
      receive a portion of an audio input,
         wherein the audio input corresponds to audio associated with a plurality of speakers;
      process, using a neural network, the portion of the audio input to determine voice activity of the plurality of speakers during the portion of the audio input,
         wherein the neural network is trained using:
            reference audio data, and
            reference diarization data corresponding to the reference audio data,
               wherein the reference diarization data indicates voice activity of individual reference speakers relative to timing of the reference audio data;
      determine, based on the neural network being used to process the portion of the audio input, a diarization output associated with the portion of the audio input,
         wherein processing the portion of the audio input comprises:
            determining permutations of voice activity of the plurality of speakers; and
            performing a cross entropy analysis of the permutations of voice activity of the plurality of speakers,
               wherein the diarization output is determined to be the permutation, of voice activity of the plurality of speakers, that satisfies a threshold permutation-invariant loss value according to the cross entropy analysis, and
         wherein the diarization output indicates individual voice activity of the plurality of speakers; and
      provide the diarization output to indicate the individual voice activity of the plurality of speakers during the portion of the audio input.

8. The device of claim 7, wherein the reference audio data of the neural network is selected to train the neural network based on a permutation invariant analysis of a plurality of reference audio samples.

9. The device of claim 7, wherein the diarization output indicates that two or more of the plurality of speakers are simultaneously actively speaking during the portion of the audio input.

10. The device of claim 7, wherein the audio input comprises an audio stream, and
   wherein the diarization output is provided in real-time relative to streaming playback of the portion of the audio stream.

11. The device of claim 7, wherein the neural network comprises at least one of:
   a recurrent neural network, or
   a long short-term memory neural network.

12. The device of claim 7, wherein the one or more processors are further configured to:
   synchronize the diarization output with the audio input to generate an annotated audio output,
      wherein the diarization output is provided within the annotated audio output.

13. The device of claim 12, wherein the annotated audio output enables one or more of the plurality of speakers to be identified as an active speaker in association with the portion of the audio input.

14. The device of claim 8, wherein, when determining the diarization output, the permutation invariant analysis causes the neural network to reduce a permutation-invariant loss,
wherein the permutation-invariant loss is reduced by causing the neural network to select the diarization output from the permutations of voice activity of the plurality of speakers.

15. A non-transitory computer-readable medium storing instructions, the instructions comprising:
one or more instructions that, when executed by one or more processors, cause the one or more processors to:
receive a portion of an audio input,
wherein the audio input corresponds to audio associated with a plurality of speakers;
process, using a neural network, the portion of the audio input to determine voice activity of the plurality of speakers during the portion of the audio input,
wherein the neural network is trained using:
reference audio data, and
reference diarization data corresponding to the reference audio data,
wherein the reference diarization data indicates voice activity of individual reference speakers relative to timing of the reference audio data;
determine, based on the neural network being used to process the portion of the audio input, a diarization output associated with the portion of the audio input,
wherein processing the portion of the audio input comprises:
determining permutations of voice activity of the plurality of speakers; and
performing a cross entropy analysis of the permutations of voice activity of the plurality of speakers,
wherein the diarization output is determined to be a permutation, of voice activity of the plurality of speakers, that satisfies a threshold permutation-invariant loss value according to the cross entropy analysis, and
wherein the diarization output indicates individual voice activity of the plurality of speakers; and
provide the diarization output to indicate the individual voice activity of the plurality of speakers during the portion of the audio input.

16. The non-transitory computer-readable medium of claim 15, wherein the one or more instructions, that cause the one or more processors to process the portion of the audio input, further cause the one or more processors to:
determine permutations of voice activity of the plurality of speakers; and
perform a loss analysis of the permutations of voice activity of the plurality of speakers,
wherein the diarization output is determined to be a permutation that satisfies a threshold permutation-invariant loss value according to the loss analysis.

17. The non-transitory computer-readable medium of claim 15, wherein the reference diarization data of the neural network is selected to train the neural network based on a permutation invariant analysis of a plurality of reference audio samples.

18. The non-transitory computer-readable medium of claim 17, wherein, when determining the diarization output, the permutation invariant analysis causes the neural network to reduce a permutation-invariant loss,
wherein the permutation-invariant loss is reduced by causing the neural network to select the diarization output from the permutations of voice activity of the plurality of speakers.

19. The non-transitory computer-readable medium of claim 15, wherein the one or more instructions further cause the one or more processors to:
synchronize the diarization output with the audio input to generate an annotated audio output,
wherein the annotated audio output enables one or more of the plurality of speakers to be identified as an active speaker in association with the portion of the audio input.

20. The non-transitory computer-readable medium of claim 15, wherein the reference audio data of the neural network is selected to train the neural network based on a permutation invariant analysis of a plurality of reference audio samples.

* * * * *